United States Patent
Xu et al.

(10) Patent No.: US 11,509,911 B2
(45) Date of Patent: *Nov. 22, 2022

(54) CONVERSION OF DECODED BLOCK VECTOR FOR INTRA PICTURE BLOCK COMPENSATION

(71) Applicant: TENCENT AMERICA LLC, Palo Alto, CA (US)

(72) Inventors: Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/314,701

(22) Filed: May 7, 2021

(65) Prior Publication Data

US 2021/0266567 A1 Aug. 26, 2021

Related U.S. Application Data

(63) Continuation of application No. 16/860,975, filed on Apr. 28, 2020, now Pat. No. 11,070,816.

(Continued)

(51) Int. Cl.
*H04N 19/159* (2014.01)
*H04N 19/174* (2014.01)
(Continued)

(52) U.S. Cl.
CPC ......... *H04N 19/159* (2014.11); *H04N 19/174* (2014.11); *H04N 19/176* (2014.11); *H04N 19/96* (2014.11)

(58) Field of Classification Search
None
See application file for complete search history.

(56) References Cited

U.S. PATENT DOCUMENTS

| 11,070,816 B2 * | 7/2021 | Xu ........................ H04N 19/96 |
| 2015/0195559 A1 | 7/2015 | Chen et al. |

(Continued)

FOREIGN PATENT DOCUMENTS

| JP | 2017130938 A | 7/2017 |
| RU | 2654200 C1 | 5/2018 |

(Continued)

OTHER PUBLICATIONS

Chen et al., "Screen content coding using non-square intra block copy for HEVC", Year: 2020.

(Continued)

*Primary Examiner* — Kaitlin A Retallick
(74) *Attorney, Agent, or Firm* — ArentFox Schiff LLP

(57) ABSTRACT

Methods, apparatuses, and non-transitory computer-readable mediums are provided. A coded video bitstream including a current picture is received. A determination is made as to whether a current block in a current coding tree unit (CTU) included in the current picture is coded in intra block copy (IBC) mode based on a flag included in the coded video bitstream. In response to the current block being determined as coded in IBC mode, a block vector that points to a first reference block of the current block is determined; an operation is performed on the block vector so that when the first reference block is not fully reconstructed or not within a valid search range of the current block, the block vector is modified to point to a second reference block that is in a fully reconstructed region and within the valid search range of the current block; and the current block is decoded based on the modified block vector.

20 Claims, 15 Drawing Sheets

Related U.S. Application Data

(60) Provisional application No. 62/863,037, filed on Jun. 18, 2019.

(51) Int. Cl.
*H04N 19/96* (2014.01)
*H04N 19/176* (2014.01)

(56) References Cited

U.S. PATENT DOCUMENTS

| | | |
|---|---|---|
| 2015/0271517 A1 | 9/2015 | Pang et al. |
| 2017/0054996 A1 | 2/2017 | Xu et al. |
| 2017/0085905 A1 | 3/2017 | Kadono et al. |
| 2017/0094271 A1* | 3/2017 | Liu ............ H04N 19/176 |
| 2017/0099495 A1 | 4/2017 | Rapaka et al. |
| 2017/0155914 A1 | 6/2017 | Jeon et al. |

FOREIGN PATENT DOCUMENTS

| | | |
|---|---|---|
| WO | 2015/054811 A1 | 4/2015 |
| WO | 2016/004850 A1 | 1/2016 |
| WO | 2020228744 A1 | 11/2020 |

OTHER PUBLICATIONS

PCT International Search Report and Written Opinion Issued in Application PCT/US2020/036915 dated Sep. 14, 2020, (19 pages).
Xiaozhong Xu et al., "CE8-related: Unified intra block copy block vector prediction", Joint Video Experts Team (JVET) of ITU-T SG 16 WP 3 and ISO/IEC JTC 1/SC 29/WG 11, JVET-N0382-v2, 14th Meeting: Geneva, CH, Mar. 19-27, 2019 (10 pages).
Xiaozhong Xu et al., "Intra Block Copy in HEVC Screen Content Coding Extensions", IEEE Journal on Emerging and Selected Topics in Circuits and Systems, vol. 6, Issue 6, Dec. 2016 (11 pages).
Shan Liu et al., "Overview of HEVC Extensions on Screen Content Coding", APSIPA Transactions on Signal and Information Processing, 4, Sep. 22, 2015 (12 pages).
Rajan Joshi et al., High Efficiency Video Coding (HEVC) Screen Content Coding: Draft 6, Joint Collaborative Team on Video Coding (JCT-VC) of ITU-T SG 16 WP 3 and ISO/IEC JTC 1/SC 29/WG 11, JCTVC-W1005-v4, 23rd Meeting: San Diego, USA, Feb. 19-26, 2016 (673 pages).
Xiaozhong Xu et al., "CE8: CPR mode with local search ranges (Test CE8.3.1 and CE8.3.2)", Joint Video Experts Team (JVET) of ITU-T SG 16 WP 3 and ISO/IEC JTC 1/SC 29/WG 11, JVET-L0293-v2, 12th Meeting: Macao, CN, Oct. 3-12, 2018 (5 pages).
Xiaozhong Xu et al., "CE8-related: CPR mode with local search range optimization", Joint Video Experts Team (JVET) of ITU-T SG 16 WP 3 and ISO/IEC JTC 1/SC 29/WG 11, JVET-L0297-v1, 12th Meeting: Macao, CN, Oct. 3-12, 2018 (6 pages).
Benjamin Bross et al., "Versatile Video Coding (Draft 3)", Joint Video Experts Team (JVET) of ITU-T SG 16 WP 3 and ISO/IEC JTC 1/SC 29/WG 11, JVET-L1001-v7, 12th Meeting: Macao, CN, Oct. 3-12, 2018 (225 pages).
Li et al.—"Further work on top of Tencent's CfP response", Joint Video Experts Team (JVET) of ITU-T SG 16 WPS and ISO/IEC JTC 1/SC 29/WG 11, $10^{th}$ Meeting: San Diego, US, Apr. 10-20, 2018, Document JVET-J0047-v2 (4 pages).
Gao et al.—"CE-8 related: Dedicated IBC reference buffer without bitstream restrictions", Joint Video Experts Team (JVET) of ITU-T SG 16 WP3 and ISO/IEC JTC 1/SC 29/WG 11, $15^{th}$ Meeting: Gothenburg, SE. Jul. 3-12, 2019, Document: JVET-O0248 (7 pages).
Office Action and Search Report dated Dec. 28, 2021 issued in corresponding Russian application 2021128021/07.
Xu et al.—"CE8-reiated: Modulo operations for ISO block vectors", Joint Video Experts Team (JVET) of ITU-T SG 16 WP 3 and ISO/IEC JTC 1/SC 29/WG 11, $15^{th}$ Meeting: Gothenburg, SE, Jul. 3-12, 2019, Document: JVET-O0482-v1.
Extended Search Report dated Dec. 3, 2021 issued in corresponding European patent application No. 20825712.1.
Office Action dated Aug. 30, 2022 issued in corresponding Japanese application 2021-544430 with English Translation, pp. 1-26.
Jizheng Xu, et al., Non-CE8: On IBC reference buffer design, Joint Video Experts Team (JVET) of ITU-T SG 16 WP 3 and ISO/IEC JTC 1/SC 29/WG11, JVET-N0472_v2, Mar. 22, 2019, pp. 1-8.

\* cited by examiner

CONVERSION OF DECODED BLOCK VECTOR FOR INTRA PICTURE BLOCK COMPENSATION

INCORPORATION BY REFERENCE

This present application is a continuation of U.S. Ser. No. 16/860,975, "CONVERSION OF DECODED BLOCK VECTOR FOR INTRA PICTURE BLOCK COMPENSATION", filed on Apr. 28, 2020, which claims the benefit of priority to U.S. Provisional Application No. 62/863,037, "CONVERSION OF DECODED BLOCK VECTOR FOR INTRA PICTURE BLOCK COMPENSATION" filed on Jun. 18, 2019, which is hereby incorporated by reference in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge."

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video coding at a decoder. In an embodiment, a method of video coding at a decoder is provided. In the method, a coded video bitstream including a current picture is received. A determination is made as to whether a current block in a current coding tree unit (CTU) included in the current picture is coded in intra block copy (IBC) mode based on a flag included in the coded video bitstream. In response to the current block being determined as coded in IBC mode, a block vector that points to a first reference block of the current block is determined; an operation is performed on the block vector so that when the first reference block is not fully reconstructed or not within a valid search range of the current block, the block vector is modified to point to a second reference block that is in a fully reconstructed region and within the valid search range of the current block; and the current block is decoded based on the modified block vector.

In an embodiment, the fully reconstructed region and the current block are in the same tile, slice, or tile group;

In an embodiment, the performing the operation includes performing a modulo operation on each of an x component and a y component of the block vector based on a size of the current CTU.

In an embodiment, the performing the operation includes performing a modulo operation on an x component of the block vector based on a multiple of a size of the current CTU. The operation further includes performing a modulo operation on a y component of the block vector based on the size of the current CTU In an embodiment, the performing the operation modifies the block vector only when the first reference block is not fully reconstructed or not within the valid search range of the current block.

In an embodiment, the performing the operation does not modify the block vector when the first reference block is fully reconstructed and within the valid search range of the current block.

In an embodiment, the valid search range of the current block includes the current CTU.

In an embodiment, the performing the operation modifies the block such that an offset of the first reference block relative to a CTU including the first reference block is the same of an offset of the second reference block relative to the current CTU.

In an embodiment, the performing the operation includes clipping the block vector so that the clipped block vector points to the second reference block that is at a boundary of the valid search range of the current block when the first reference block is not fully reconstructed or not within the valid search range of the current block.

Aspects of the disclosure provide apparatuses configured to perform any of the above methods.

Aspects of the disclosure also provide non-transitory computer-readable storage mediums storing instructions which when executed by a computer cause the computer to perform any of the above methods.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Video Coding Encoder and Decoder

Figure 1:
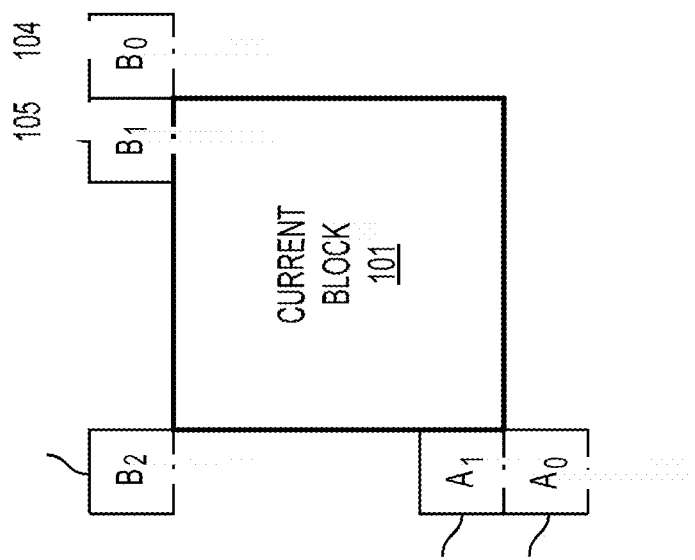
FIG. 1 is a schematic illustration of a current block and its surrounding spatial merge candidates in one example.
Figure 2:
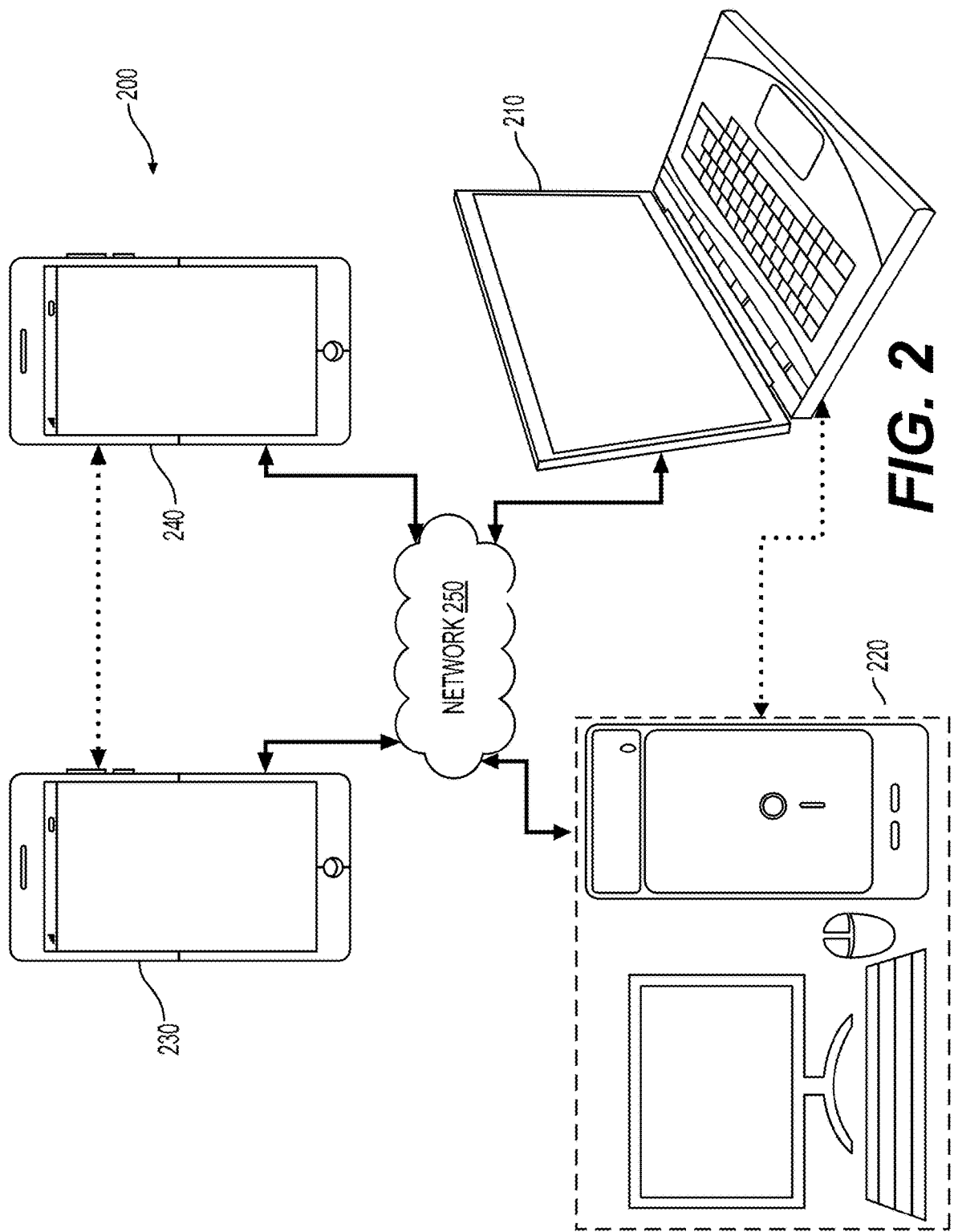
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
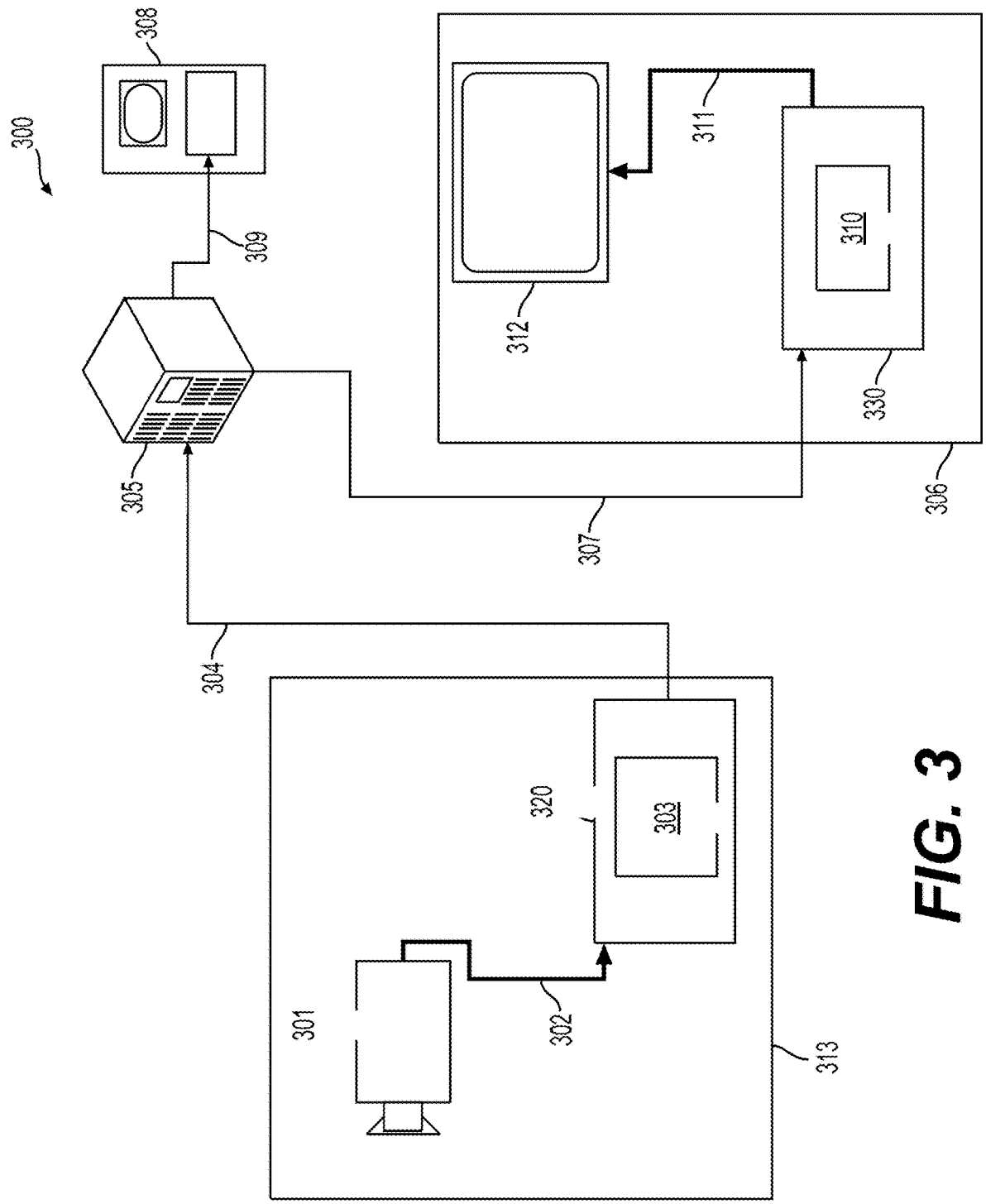
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
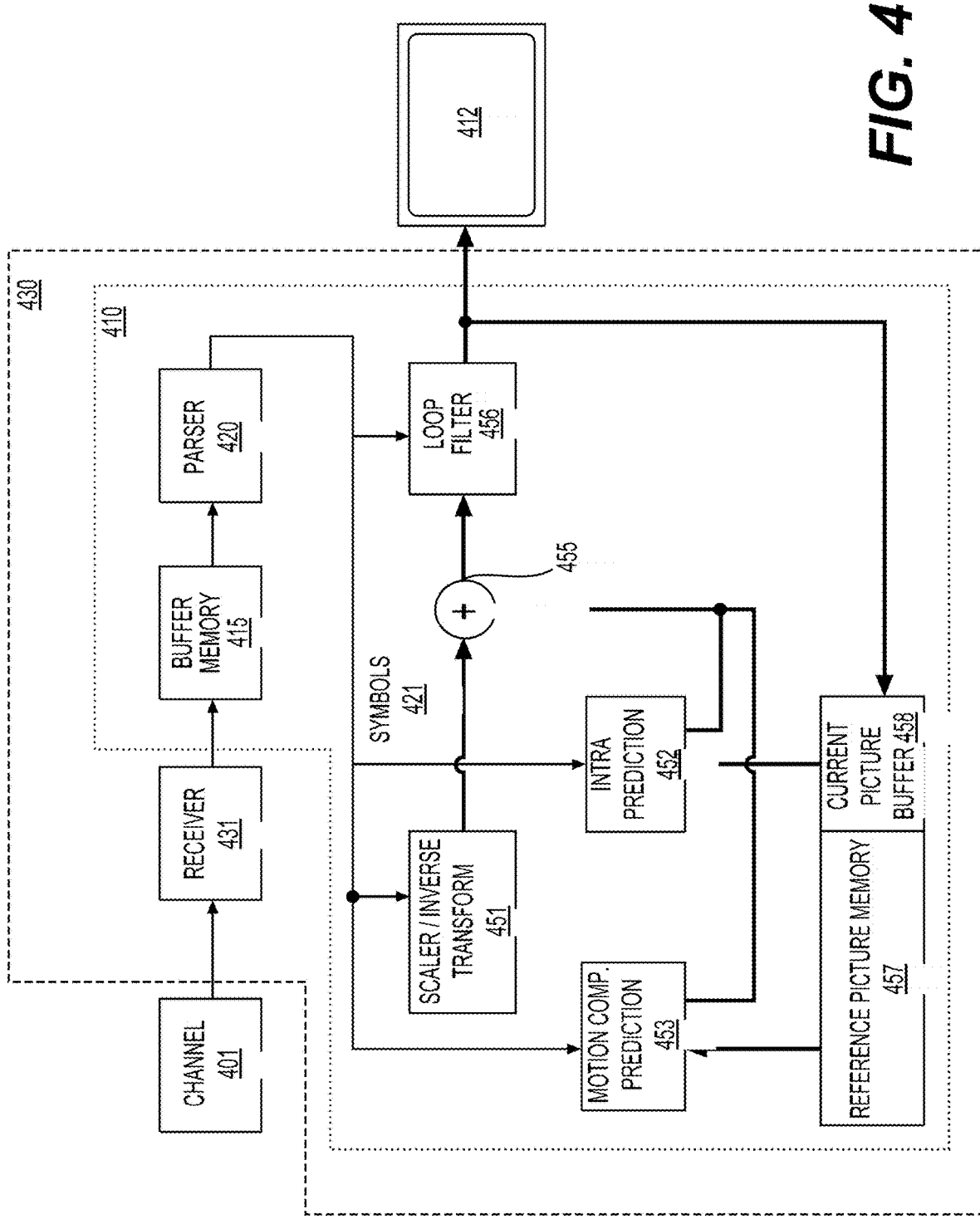
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, which can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
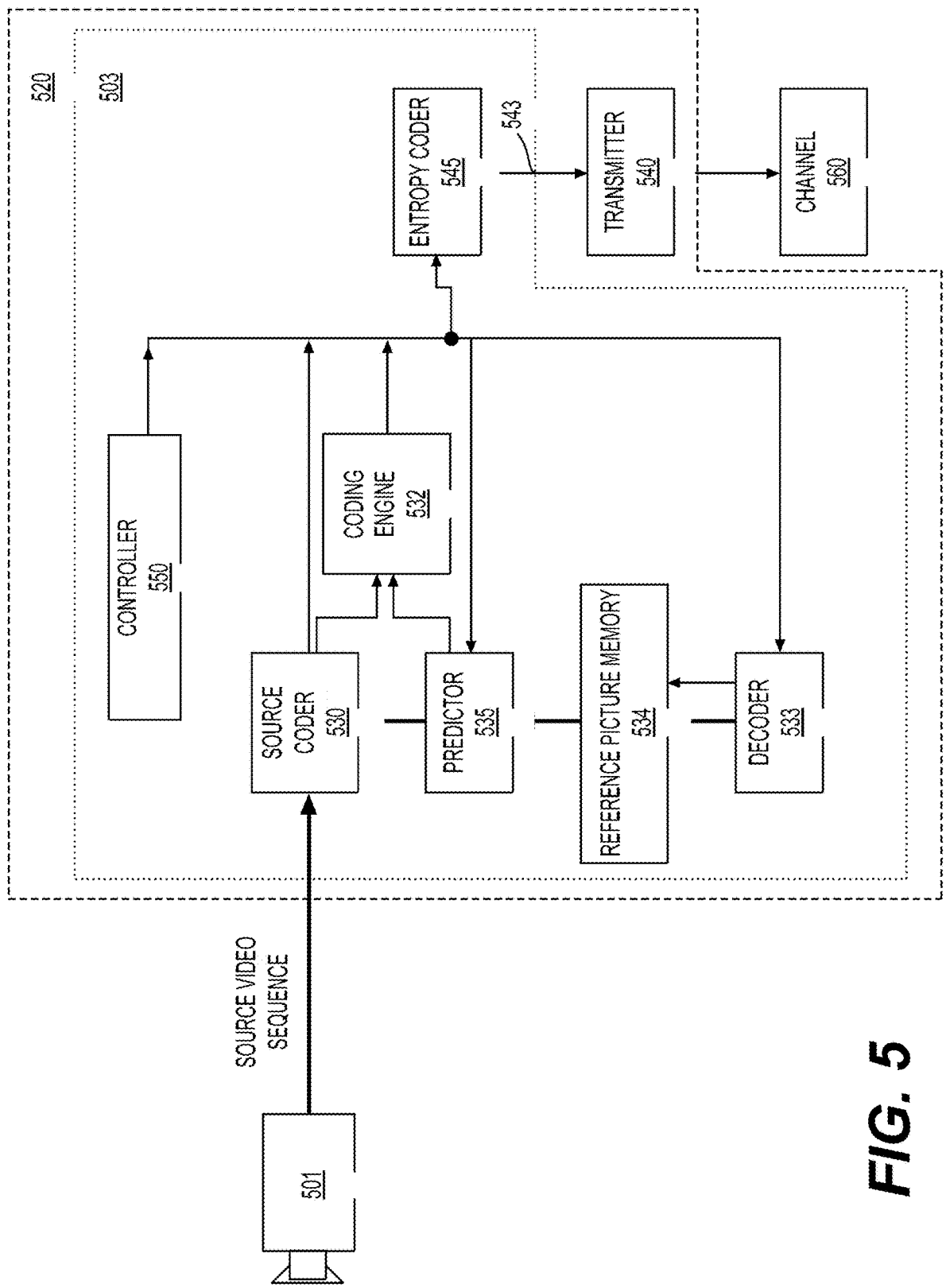
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
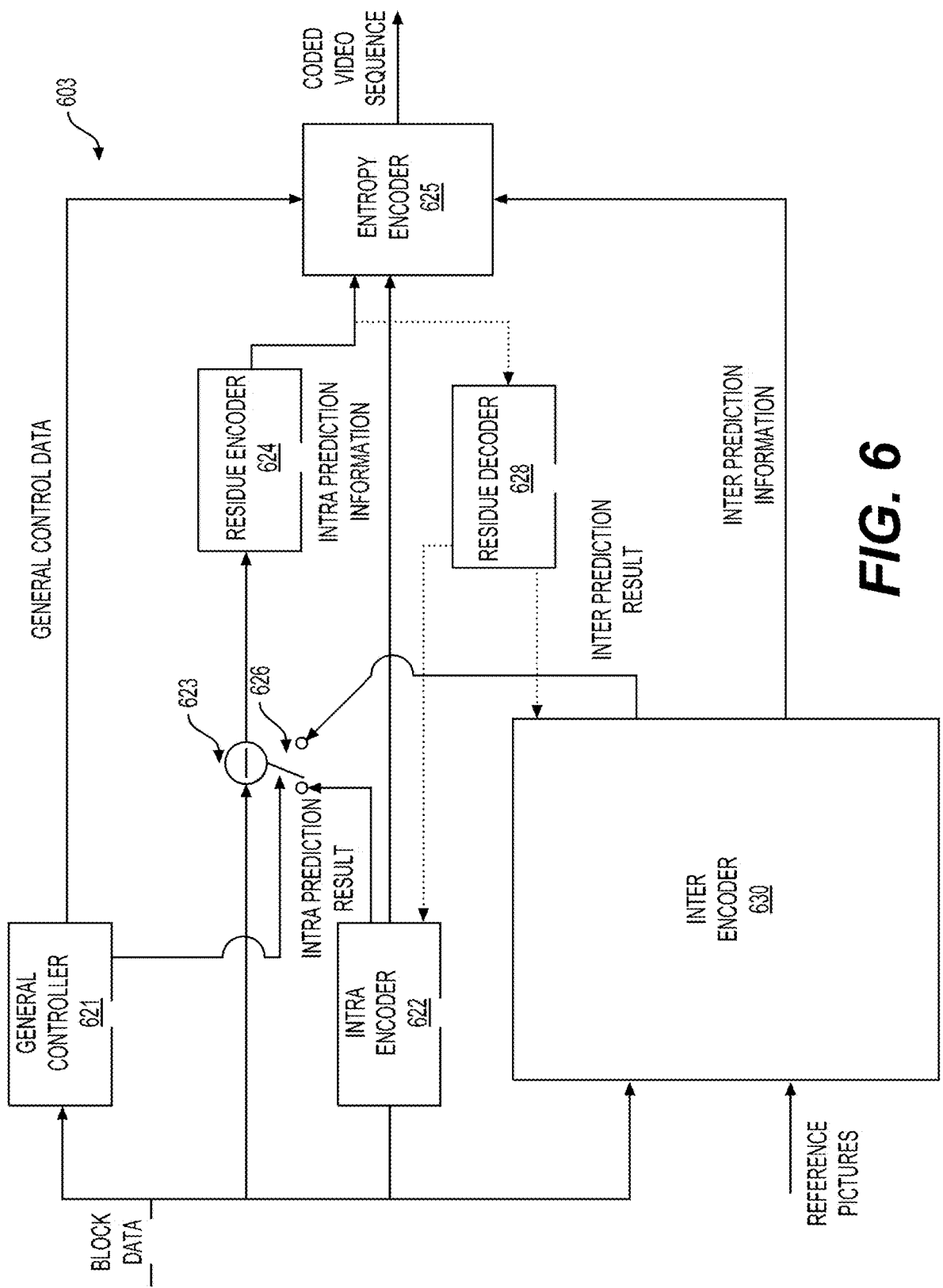
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
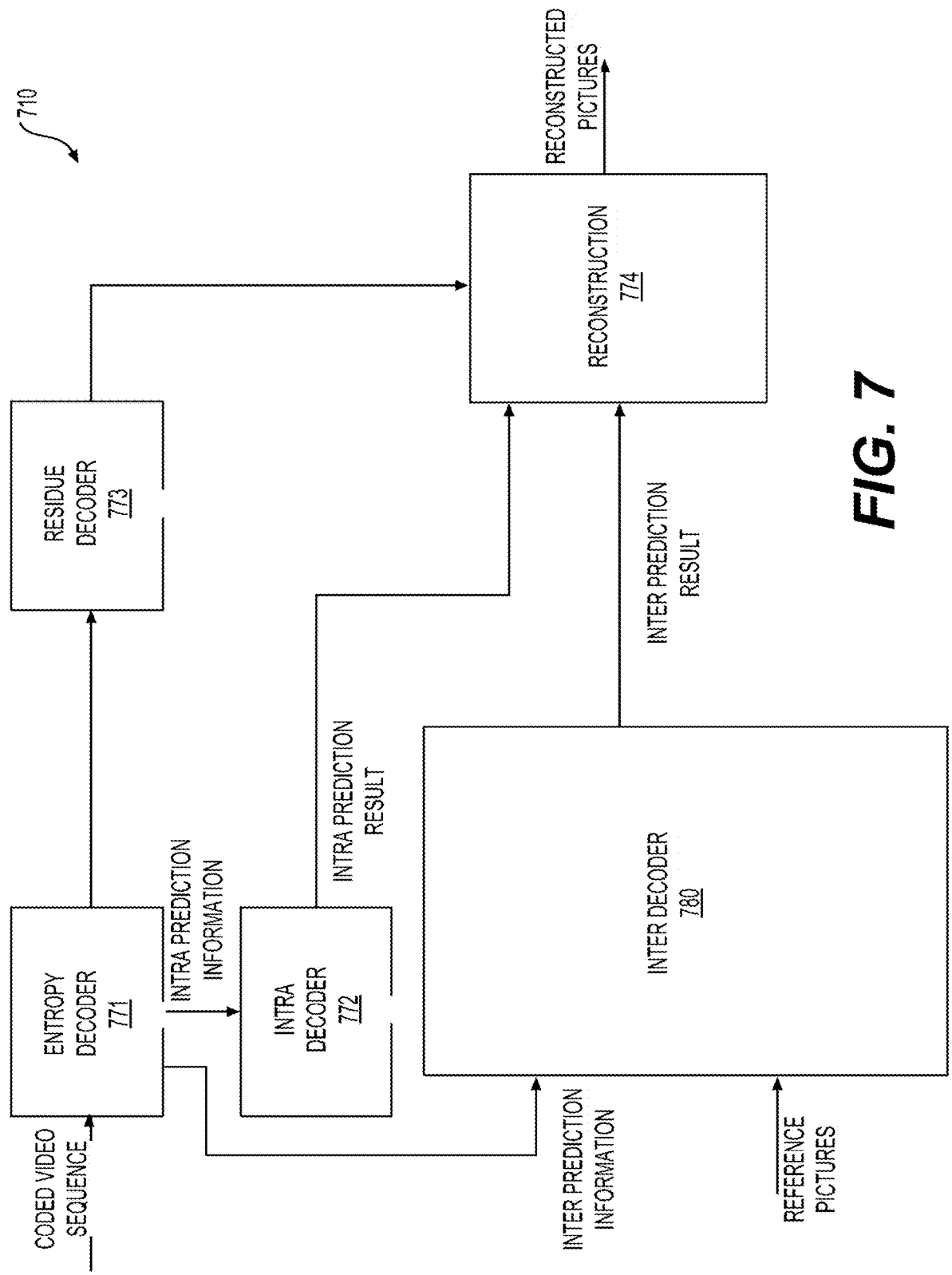
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information to include the Quantizer Parameter (QP), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Intra Block Copy

A block can be coded using a reference block from a different or same picture. Block based compensation using a reference block from a different picture can be referred to as motion compensation. Block based compensation using a reference block from a previously reconstructed area within the same picture can be referred to as intra picture block compensation, current picture referencing (CPR), or intra block copy (IBC). A displacement vector that indicates the offset between the current block and the reference block can be referred to as a block vector (BV or bvL). Different from a motion vector in motion compensation, which can be any value (positive or negative, at either the x or y direction), a BV is subject to constraints to ensure that the reference block has already been reconstructed and the reconstructed samples thereof are available. In some embodiments, in view of parallel processing constraints, a reference area that is beyond certain boundaries (e.g., a tile boundary or wavefront ladder shape boundary) is excluded.

The coding of a BV can be either explicit or implicit. In the explicit mode, the difference between a BV and its predictor can be signaled in a manner similar to an Advanced Motion Vector Prediction (AMVP) mode in inter coding. In the implicit mode, the BV can be recovered from only a predictor, for example in a similar way as a motion vector in merge mode. The resolution of a BV, in some implementations, is set to integer positions or, in some examples, fractional positions.

The use of IBC at the block level can be signaled using a block level flag (or IBC flag). In some examples, this flag can be signaled when the current block is not coded in merge mode. In other examples, this flag can be signaled by a reference index approach, for example, by treating the current decoded picture as a reference picture. Such a reference picture can be placed in the last position of the list, such as in HEVC screen content coding (HEVC SCC). This special reference picture can also be managed together with other temporal reference pictures in the decoded picture buffer (DPB).

While an embodiment of IBC is used as an example in the present disclosure, the embodiments of the present disclosure can be applied to variations of IBC. The variations for IBC include, for example, treating the IBC as a third mode, which is different from the intra or inter prediction mode. Accordingly, the block vector prediction in the merge mode and the AMVP mode may be separated from the regular inter mode. For example, a separate merge candidate list can be defined/created for the IBC mode, where all the entries in the list are block vectors. Similarly, the block vector prediction list in the IBC AMVP mode may consist of only block vectors. The block vector prediction list may follow the same logic as inter merge candidate list or AMVP predictor list in terms of candidate derivation process. For example, the 5 spatial neighboring locations in HEVC or VVC inter merge mode are accessed for IBC to derive its own merge candidate list.

Figure 8:
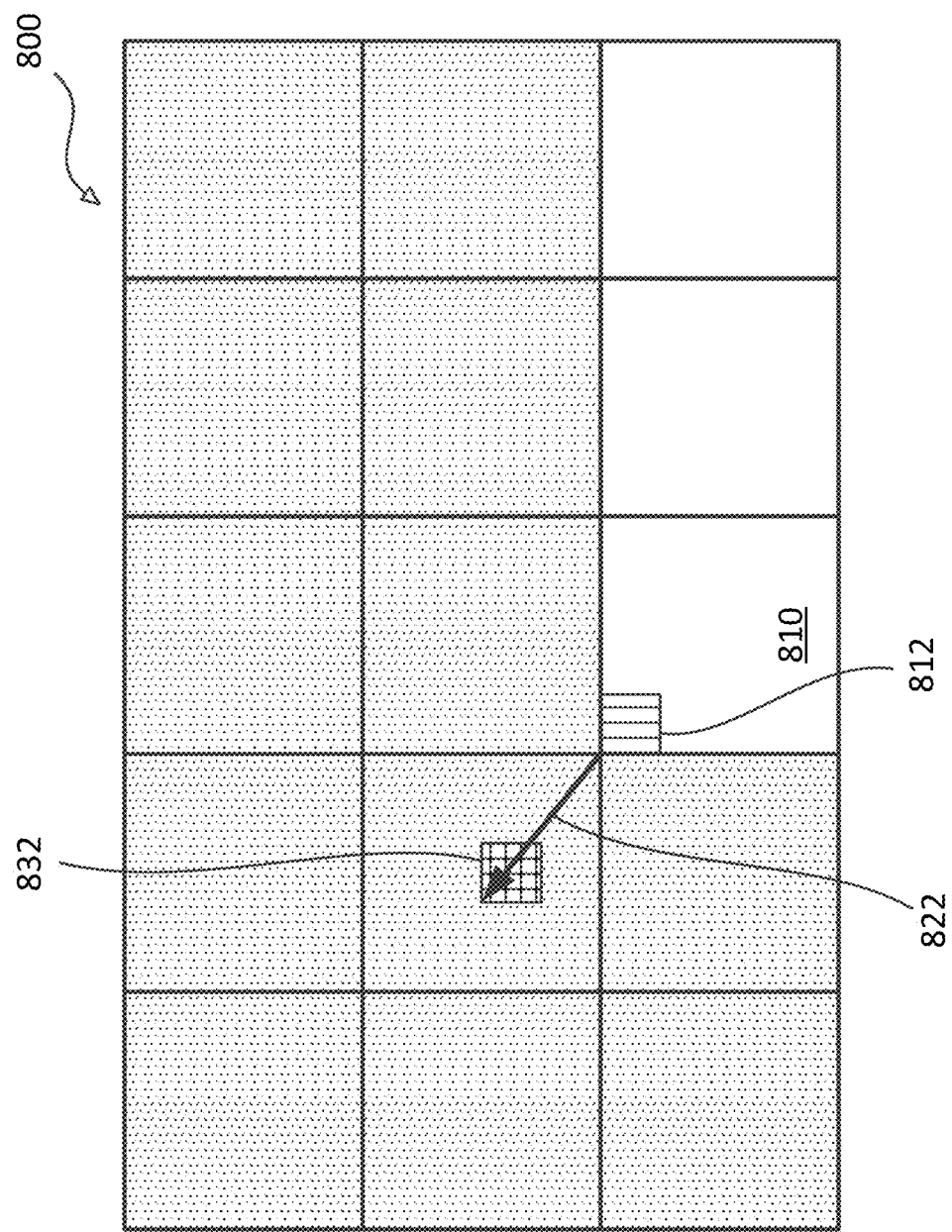
FIG. 8 shows an example of intra picture block (IBC) based compensation in accordance with an embodiment.

FIG. 8 is a schematic illustration of a current block (810) in a current picture (800) to be coded using IBC-based compensation in accordance with an embodiment. In FIG. 8, an example of using IBC-based compensation is shown where the current picture (800) includes 15 blocks arranged into 3 rows and 5 columns. In some examples, each block corresponds to a CTU. The current block (810) includes a sub-block (812) (e.g., a coding block in the CTU) that has a block vector (822) pointing to a reference sub-block (832) in the current picture (800).

The reconstructed samples of the current picture can be stored in a memory or memory block (e.g., a dedicated or designated memory or portion of memory). In consideration of implementation cost, the reference area where the reconstructed samples for reference blocks remain available may not be as large as an entire frame, depending on a memory size of the dedicated memory. Therefore, for a current sub-block using IBC-based compensation, in some examples, an IBC reference sub-block may be limited to only certain neighboring areas, but not the entire picture.

In one example, the memory size is limited to a size of one CTU, which means that the IBC mode can only be used when the reference block is within the same CTU as the current block. In another example, the memory size is limited to a size of two CTUs, which means that the IBC mode can only be used when the reference block is either within the current CTU, or the CTU to the left of current CTU. When the reference block is outside the constrained reference area (i.e., designated local area), even if it has been reconstructed, the reference samples may not be used for IBC-based compensation. Therefore, the decoder may need to check whether the recovered or determined block vector points to a reference block in the constrained reference area (i.e., valid search area). Aspects of the present disclosure include methods that remove some of the constraints, which allow the decoder to modify and use the block vector even when the block vector points to a reference block that is outside the constrained reference area.

In an embodiment, an effective memory requirement to store reference samples to be used in IBC is one CTU size. In an example, the CTU size is 128×128 samples. A current CTU includes a current region under reconstruction. The current region has a size of 64×64 samples. Since a reference memory can also store reconstructed samples in the current region, the reference memory can store 3 additional regions of 64×64 samples when a reference memory size is equal to the CTU size of 128×128 samples. Accordingly, a search range can include certain parts of a previously reconstructed CTU while a total memory requirement for storing reference samples is unchanged (such as 1 CTU size of 128×128 samples or 4 64×64 reference samples in total).

In an example, when a search range is restrained in IBC, a BV of a current block may be bounded by a current CTB boundary, a left neighbor CTB boundary, or the like, depending on a position of a current block and the memory size.

FIGS. 9A-9D show examples of IBC-based compensation according to some embodiments of the present disclosure. Referring to FIGS. 9A-9D, a current picture (901) includes a current CTU (915) under reconstruction and a previously reconstructed CTU (910) that is a left neighbor of the current CTU (915). CTUs in the current picture (901) have a CTU size and a CTU width. The current CTU (915) includes 4 regions (916)-(919). Similarly, the previously reconstructed CTU (910) includes 4 regions (911)-(914). In an embodiment, the CTU size is equal to a reference memory size. For example, the CTU size and the reference memory size are 128×128 samples, and each of the regions (911)-(914) and (916)-(919) has a size of 64×64 samples.

Figure 9A:
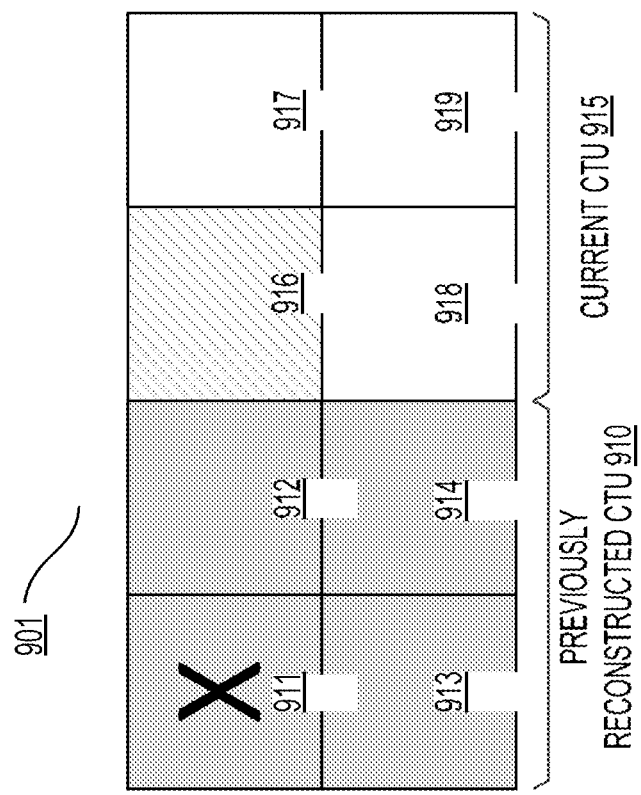
FIGS. 9A-9D show examples of IBC-based compensation in accordance with some embodiments.

Referring to FIG. 9A, the current region (916) is under reconstruction. The current region (916) includes a current block to be reconstructed. According to some embodiments, a search range for the current block excludes the collocated region (911) of the current region (916) and includes the regions (912)-(914) of the previously reconstructed CTU (910).

Figure 9B:
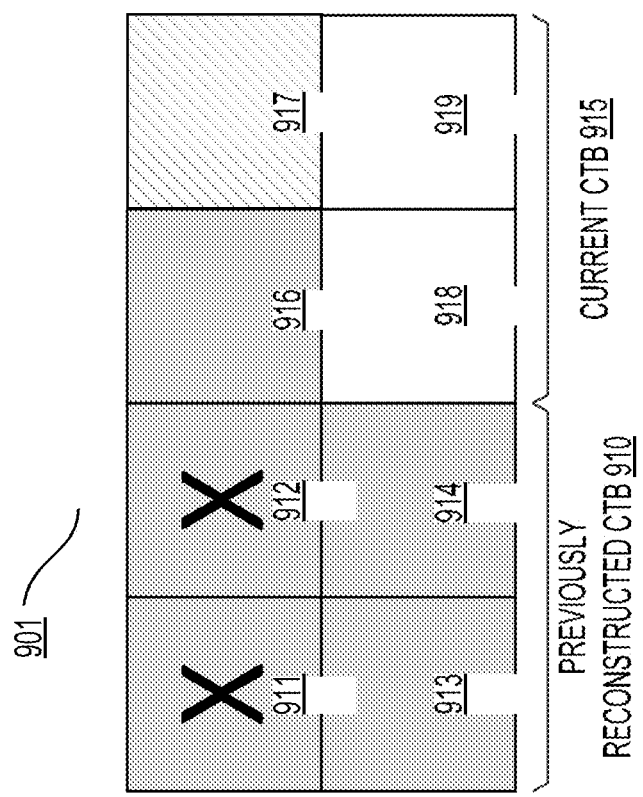

Referring to FIG. 9B, the current region (917) is under reconstruction. The current region (917) includes a current block to be reconstructed. The current region (917) has a collocated (i.e., co-located) region (i.e., the region (912) in the previously reconstructed CTU (910)). A search range for the current block excludes the collocated region (912). The search range includes the regions (913) and (914) of the previously reconstructed CTU (910) and the region (916) in the current CTU (915). The search range further excludes the region (911) due to the constraint of the reference memory size (i.e., one CTU size).

Figure 9C:
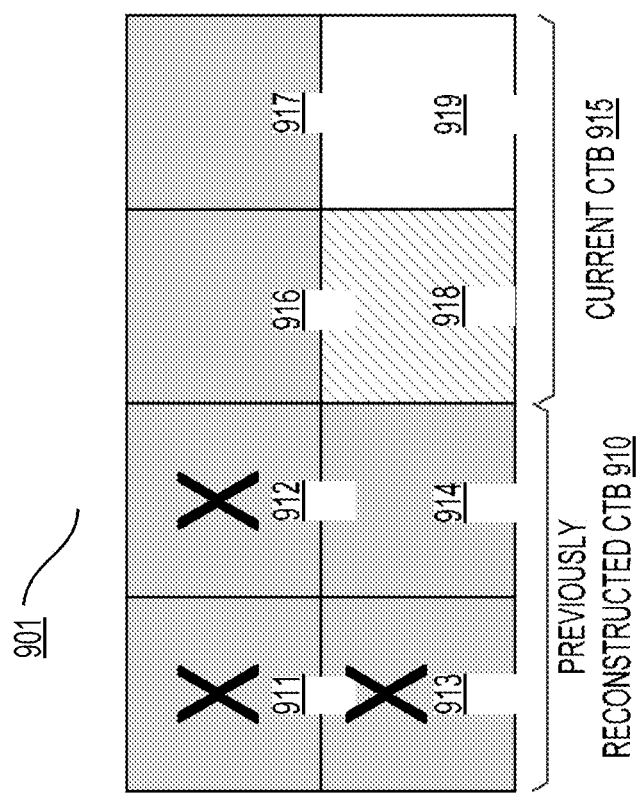

Referring to FIG. 9C, the current region (918) is under reconstruction. The current region (918) includes a current block to be reconstructed. The current region (918) has a collocated region (i.e., the region (913)) in the previously reconstructed CTU (910). A search range for the current block excludes the collocated region (913). The search range includes the region (914) of the previously reconstructed CTU (910) and the regions (916) and (917) in the current CTU (915). The search range further excludes the regions (911) and (912) due to the constraint of the reference memory size.

Figure 9D:
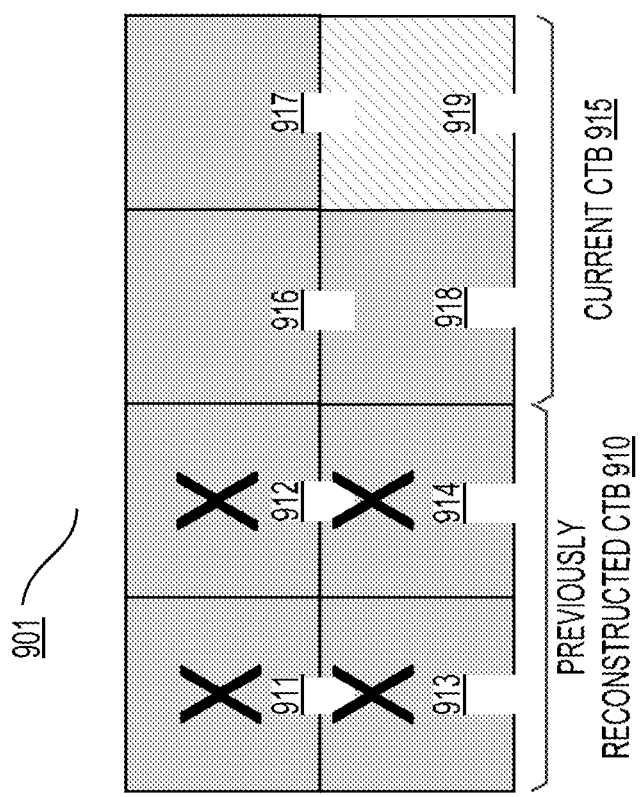

Referring to FIG. 9D, the current region (919) is under reconstruction. The current region (919) includes a current block to be reconstructed. The current region (919) has a collocated region (i.e., the region (914)) in the previously reconstructed CTU (910). A search range for the current block excludes the collocated region (914). The search range includes the regions (916)-(918) in the current CTU (915). The search range excludes the regions (911)-(913) due to the constraint of the reference memory size, and thus, the search range excludes the entire previously reconstructed CTU (910).

Various constraints can be applied to a BV and/or a search range. In an embodiment, a search range for a current block under reconstruction in a current CTU is constrained to be within the current CTU.

In an embodiment, a current picture is a luma picture and a current CTU is a luma CTU including a plurality of luma samples and a block vector (mvL, in 1/16-pel resolution). In some embodiments, the luma motion vector mvL obeys the following constraints A1, A2, B1, C1, and C2 for bitstream conformance.

In some embodiments, a first constraint (A1) and a second constraint (A2) require that a reference block for the current block is already reconstructed. For example, when the reference block has a rectangular shape, a reference block availability checking process can be implemented to check whether a top-left sample and a bottom-right sample of the reference block are reconstructed. When both the top-left sample and the bottom-right sample of the reference block are reconstructed, the reference block is determined to be reconstructed.

In the first constraint (A1), according to some embodiments, when a derivation process for reference block availability is invoked with a position (xCurr, yCurr) of a top-left sample of the current block set equal to (xCb, yCb) and a position (xCb+(mvL[0]>>4), yCb+(mvL[1]>>4)) of the top-left sample of the reference block as inputs, an output is equal to TRUE when the top-left sample of the reference block is reconstructed where the motion vector mvL is a two-dimensional vector having an x component mvL[0] and a y component mvL[1].

In the second constraint (A2), according to some embodiments, when a derivation process for block availability is invoked with the position (xCurr, yCurr) of the top-left sample of the current block set equal to (xCb, yCb) and a position (xCb+(mvL[0]>>4)+cbWidth−1, yCb+(mvL[1]>>4)+cbHeight−1) of the bottom-right sample of the reference block as inputs, an output is equal to TRUE when the bottom-right sample of the reference block is reconstructed. The parameters cbWidth and cbHeight represent a width and a height of the reference block, respectively.

A third constraint (B1), in some embodiments, includes at least one of the following conditions: 1) a value of (mvL[0]>>4)+cbWidth is less than or equal to 0, which indicates that the reference block is to the left of the current block and does not overlap with the current block; 2) a value of (mvL[1]>>4)+cbHeight is less than or equal to 0, which indicates that the reference block is above the current block and does not overlap with the current block.

In a fourth constraint (C1), in some embodiments, the following conditions are true:

$$(yCb+(mvL[1]>>4))>>CtbLog\ 2SizeY=yCb>>CtbLog\ 2SizeY \quad (1)$$

$$(yCb+(mvL[1]>>4+cbHeight-1)>>CtbLog\ 2SizeY=yCb>>CtbLog\ 2Size \quad (2)$$

$$(xCb+(mvL[0]>>4))>>CtbLog\ 2SizeY>= (xCb>>CtbLog\ 2SizeY)-1 \quad (3)$$

$$(xCb+(mvL[0]>>4)+cbWidth-1)>>CtbLog\ 2SizeY<= (xCb>>CtbLog\ 2SizeY) \quad (4)$$

where CtbLog 2SizeY represents the CTU width in a log 2 form. For example, when the CTU width is 128 samples, CtbLog 2SizeY is 7. Eqs. (1) and (2) specify that a CTU including the reference block is in a same CTU row as the current CTU (i.e., the previously reconstructed CTU (1010) is in a same row as the current CTU (1015) when the reference block is in the previously reconstructed CTU (1010)). Eqs. (3) and (4) specify that the CTU including the reference block is either in a left CTU column of the current CTU or a same CTU column as the current CTU. The fourth constraint as described by Eqs. (1)-(4) specify that the CTU including the reference block is either the current CTU, or a left neighboring CTU of the current CTU.

A fifth constraint (C2), in some embodiments, includes that when the reference block is in the left neighbor of the current CTU, a collocated region for the reference block is not reconstructed (i.e., no samples in the collocated region have been reconstructed). Further, the collocated region for the reference block is in the current CTU.

In an example, the fifth constraint can be specified as below: When (xCb+(mvL[0]>>4))>>CtbLog 2SizeY is equal to (xCb>>CtbLog 2SizeY)-1, the derivation process for reference block availability is invoked with the position of the current block (xCurr, yCurr) set equal to (xCb, yCb) and a position (((xCb+(mvL[0]>>4)+CtbSizeY)>>(CtbLog 2SizeY-1))<<(CtbLog 2SizeY-1), ((yCb+(mvL[1]>>4))>>(CtbLog 2SizeY-1))<<(CtbLog 2SizeY-1)) as inputs, an output is equal to FALSE indicating that the collocated region is not reconstructed.

In the above equations, xCb and yCb are the x and y coordinates of the current block, respectively. The variables cbHeight and cbWidth are the height and width of the current block, respectively. The variables mvL0[0] and mvL0[1] refer to the x and y components of block vector mvL0, respectively. The constraints for the search range and/or the block vector can include a suitable combination of the first, second, third, fourth, and fifth constraints described above. In an example, the first, second, third, fourth, and/or fifth constraints can be modified.

III. Spatial Merge Candidates

Figure 10:
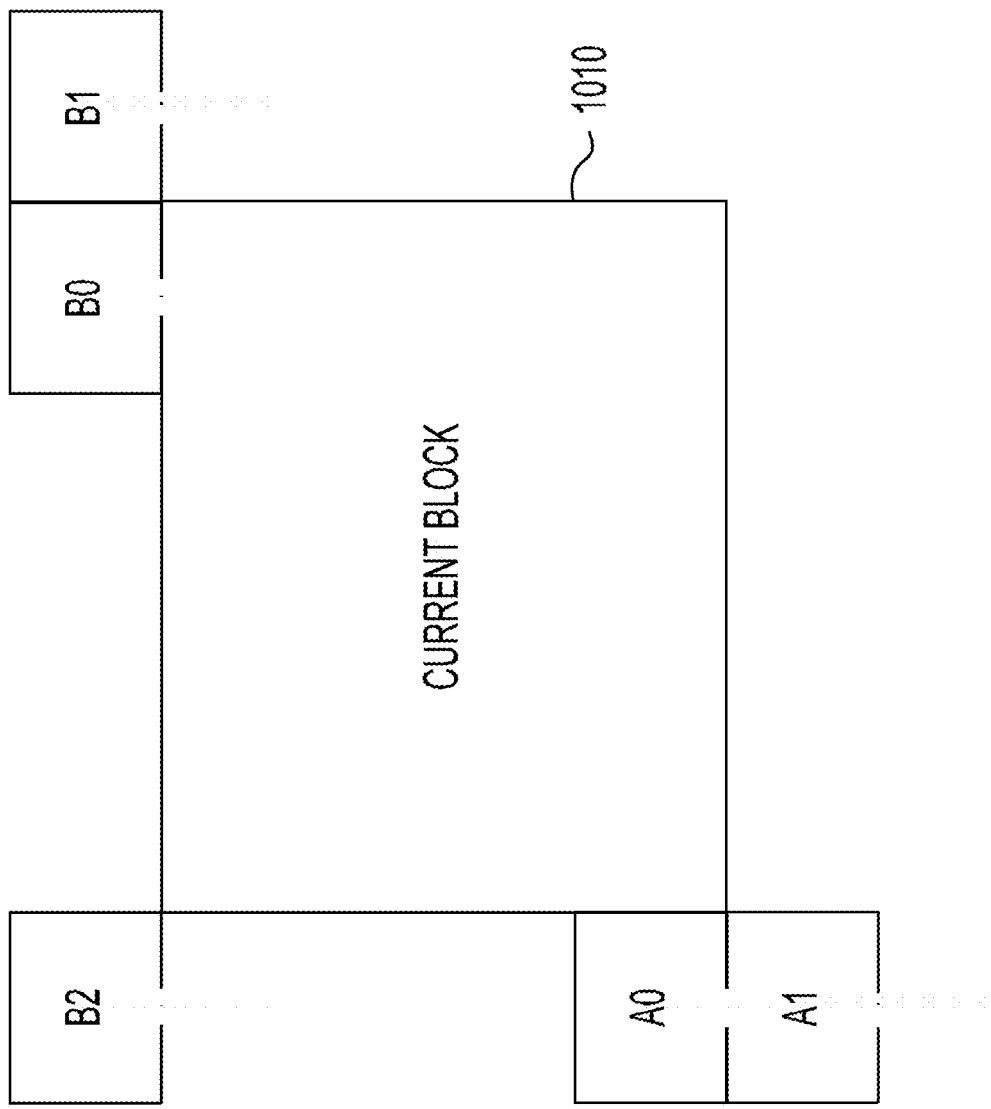
FIG. 10 shows an example of spatial merge candidates in accordance with an embodiment.

FIG. 10 shows an example of spatial merge candidate positions of a current block (1010) in accordance with an embodiment. A maximum of four merge candidates can be selected and derived among the candidate positions shown in FIG. 10. The order of the derivation can be A0, B0, B1, A1 and B2 in one example. In an example, the position B2 is considered only when any CU of position A0, B0, B1, and A1 is not available or is intra coded. In an example, the CU of a position may not be available when the CU belongs to another slice or tile.

IV. History-Based Merge Candidates Derivation

In some embodiments, history-based motion vector prediction (HMVP) merge candidates are added to an extended merge list of a current CU after the spatial and temporal candidate MVP. In HMVP, motion information of a previously coded block can be stored in a table (or a history buffer) and used as a MVP candidate for the current CU. Such motion information is referred to as HMVP candidates. The table with multiple HMVP candidates can be maintained during an encoding or decoding process. The table can be reset (emptied) when a new CTU row is encountered in one example. Whenever there is a non-sub-block inter-coded CU, the associated motion information can be added to a last entry of the table as a new HMVP candidate in an embodiment.

In an embodiment, a size of an HMVP table, denoted by S, is set to be 6. Accordingly, up to 6 HMVP candidates may be added to the table. When inserting a new motion candidate to the table, a constrained first-in-first-out (FIFO) rule can be utilized in an embodiment. In addition, a redundancy check can be applied when adding a new HMVP candidate to find whether there is an identical HMVP in the table. If an identical HMVP in the table is found, the identical HMVP candidate may be removed from the table and all the HMVP candidates following the removed HMVP candidate are moved forward. The new HMVP candidate can then be added at the end of the table.

In an embodiment, HMVP candidates are used in an extended merge candidate list construction process. Several newly added HMVP candidates in the table can be checked in order and inserted to the extended candidate list at positions after TMVP candidate in an embodiment. A redundancy check may be applied to determine if the HMVP candidates are similar or the same as a spatial or temporal merge candidate previously added to the extended merge list.

HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In some applications, K is set to 4 while the AMVP list size is kept unchanged, i.e., equal to 2.

To reduce the number of redundancy check operations, the following simplifications are introduced in an embodiment:

(i) The number of HMPV candidates used for generation of an extended merge list is set as (N<=4)? M: (8−N), wherein N indicates a number of existing candidates in the extended merge list and M indicates a number of available HMVP candidates in a history table.

(ii) Once a total number of available merge candidates in the extended merge list reaches a number of the maximally allowed merge candidates minus 1, the merge candidate list construction process from HMVP is terminated.

According to some embodiments, when IBC operates as a separate mode from inter mode, a separate history buffer, referred to as HBVP, may be used for storing previously coded IBC block vectors. As a separate mode from inter prediction, it is desirable to have a simplified block vector derivation process for IBC mode. The candidate list for IBC BV prediction in AMVP mode may share the one used in IBC merge mode (merge candidate list), with 2 spatial candidates+5 HBVP candidates.

The merge candidate list size of IBC mode may be assigned as MaxNumMergeCand. The MaxNumMergeCand may be determined by the inter mode merge candidate list size MaxNumMergeCand, which is specified, in some examples, as six_minus_max_num_merge_cand. The variable six_minus_max_num_merge_cand may specify the maximum number of merge motion vector prediction (MVP) candidates supported in a slice subtracted from 6.

In some examples, the maximum number of merge MVP candidates, MaxNumMergeCand is derived may be derived as:

MaxNumMergeCand=6−six_minus_max_num_merge_cand

The value of MaxNumMergeCand may be in the range of 1 to 6, inclusive. The BV prediction in non-merge mode may share the same list generated for IBC merge mode. However, in some examples, for a non-merge mode case, the candidate list size is always 2. Accordingly, there is a need to develop proper methods to handle the IBC merge candidate list size as well as IBC non-merge mode (AMVP mode) predictor list size when MaxNumMergeCand is set to be various values and the maximum number of IBC merge candidate list is set differently compared to an inter merge candidate list size.

V. Conversion/Modification of Block Vector for IBC Mode

As described above, the existing constraints for a valid decoded block vector includes at least two requirements in some embodiments:

(i) The reference block pointed by the block vector needs to be fully reconstructed and inside the same coding region as the current block. The same coding region may refer to areas that samples can predict each other, such as the same tile, or slice, or tile group. This type of constraint may be referred to as availability check constraint.

(ii) The reference block pointed by the block vector needs to be inside the allowed search range in view of the considerations of wave parallel processing (WPP) capability, and current and left CTU range for memory requirement, etc. This type of constraint may be referred to as a range constraint.

Aspects of the disclosure include methods that convert/modify the decoded block vector such that some of the constraints (e.g., range constraint, availability check) may be removed. In this regard, the decoder may not need to check if the block vector meets some of the requirements in decoding a current block in IBC mode.

For example, the bitstream conformance constraints may include that the motion vector (mvL) shall point to a reference block that is fully contained in the same CTU as the current block or fully contained in a block to the left with the same height of the current CTU and a width equal to 128 luma samples, i.e., all of the following conditions shall be true:

$$yRefTL\text{>>}CtbLog\ 2SizeY=yCb\text{>>}CtbLog\ 2SizeY; \quad (5)$$

$$yRefBR\text{>>}CtbLog\ 2SizeY=yCb\text{>>}CtbLog\ 2SizeY; \quad (6)$$

$$xRefTL\text{>>}CtbLog\ 2SizeY\text{>=}(xCb\text{>>}CtbLog\ 2SizeY)+\\ Min(1,7-CtbLog\ 2SizeY)-(1\text{<<}((7-CtbLog\ 2SizeY)\text{<<}1))); \quad (7)$$

$$xRefBR\text{>>}CtbLog\ 2SizeY\text{<=}(xCb\text{>>}CtbLog\ 2SizeY). \quad (8)$$

The above bitstream conformance constraints (i.e., Eqs. (5)-(8)) may be removed when the block vector is converted/modified according to some embodiments of the present disclosure.

In some embodiments of the present disclosure, a modulo operation may be performed on both the x and y components of a block vector based on a size of a current CTU such that, when a reference block's top-left location is outside the pre-defined search range for IBC (e.g., current CTU or the left neighboring CTU), the modified block vector may move the reference block's top-left corner within a target range (e.g., the allowed/valid search range based on the reference memory size and the position of the current block in the current CTU). In an example, the modified block vector may point to another reference block's top-left corner within the target range. Alternatively, when the block vector points to a reference block that is within the target range, no change (e.g., modification) may be applied to this block vector.

In an embodiment of the present disclosure, an invalid block vector (e.g., out of the valid search range) may be modified to be in the current CTU. In an embodiment of the present disclosure, an invalid block vector may be modified to be in the current CTU or the left neighboring CTU when the target range includes the current CTU and the left neighboring CTU. In an embodiment of the present disclosure, the target range can include the current CTU and a number of left CTUs depending on a size of the reference sample memory and a size of the CTUs in the current picture.

In an example, the x component of the block vector and the y component of the block vector may be modified using the following formulas:

$$bvL[0]=xRefTL\%CtbSizeY+xCurrCtuTL-xCb-\\ ((xRefCtuTL\text{<}xCurrCtuTL\&\&xCurrCtuTL-\\ xRefCtuTL\text{<=}numLeftCtus*CtbSizeY)?xCurr\\CtuTL-xRefCtuTL:0) \quad (9)$$

$$bvL[1]=yRefTL\%CtbSizeY+yCurrCtuTL-yCb. \quad (10)$$

In the above two Eqs. (9) and (10), bvL[0] represents the x component of the block vector and bvL[1] represents the y component of the block vector. CtbSizeY represents a size of the CTU (e.g., in luma samples) and "%" is a modulo operator. The modulo operator can be performed based on a multiple of a size of the CTU when the target range includes one or more left CTUs. The multiple corresponds to the number of one or more left CTUs included in the target range. For example, the multiple can be equal to 2 when the target range includes the current CTU and a left neighboring CTU, or 8 when the target range includes the current CTU and three left CTUs. The top-left location of the current CTU (xCurrCtuTL, yCurrCtuTL) and the top-left location of the CTU that the reference block locates in (xRefCtuTL, yRefCtuTL) may be derived as follows:

$$(xCurrCtuTL,yCurrCtuTL)=((xCb\text{>>}\\ CtbLog\ 2SizeY)\text{<<}CtbLog\ 2SizeY,\\ (yCb\text{>>}CtbLog\ 2SizeY)\text{<<}CtbLog\ 2SizeY); \quad (11)$$

$$(xRefCtuTL,yRefCtuTL)=((xRefTL\text{>>}CtbLog\\ 2SizeY)\text{<<}CtbLog\ 2SizeY,(yRefTL\text{>>}CtbLog\\ 2SizeY)\text{<<}CtbLog\ 2SizeY. \quad (12)$$

In addition, the variable numLeftCtus in Eq. (9) indicates the number of left CTUs of the current CTU and may be derived as follows:

$$numLeftCtus=(1\text{<<}((7-CtbLog\ 2SizeY)\text{<<}-Min(1,7-\\ CtbLog\ 2SizeY) \quad (13)$$

After the modification, a shifting operation may be performed to change the resolution of the block vector into the one used for storage. The following is an example of shifting the resolution of the block vector:

$$mvL[0]=bvL[0]\text{<<}4; \quad (14)$$

$$mvL[1]=bvL[1]\text{<<}4. \quad (15)$$

In some embodiments of the present disclosure, the block vector may be modified such that the offset of the reference block relative to the CTU where it was located before modification is the same as the offset of the modified reference block to the current CTU after the modification. In this regard, the modification of the block vector may not result in a modification of the offset. The offset may be equal to (xRefCtuTL<xCurrCtuTL && xCurrCtuTL−xRefCtuTL<=numLeftCtus*CtbSizeY) in Eq. (9).

In an embodiment of the present disclosure, the reference block's bottom-right corner (xRefBR, yRefBR) may be modified in a similar way as its top-left corner (xRefTL, yRefTL), which is described above. Therefore, aspects of the disclosure can ensure that the entire reference block is within the current CTU, not just the top-left corner of the reference block.

In an embodiment of the present disclosure, a clipping operation may be performed to regulate the decoded block vector such that after clipping, the block vector always points to a reference block within the target range. When a reference block's top-left location is outside the allowed search range for IBC (e.g., current CTU or the left neighboring CTU), the modified block vector can adjust the reference block's top-left corner so that the reference block's top-left corner is within a target range. Alternatively, when the block vector points to a reference block within the target range, no change (e.g., clipping operation) may be applied to this block vector.

In an example, if one of the x or y component of the block vector is outside the target range, by applying the clipping operation, the top-left corner of the reference block may be clipped into the target range. The bottom-right corner of the reference block may also be clipped into the target range. When both the top-left corner of the reference block and the bottom-right corner of the reference block are clipped into the target range, the entire reference block is within the target range.

In an embodiment, when the reference block's top-left corner's y coordinate (indicated by the block vector) is outside the current CTU row, the block vector may be clipped to be at the top row of the current CTU (i.e., at a boundary of the current CTU). Similarly, when the reference block's top-left corner's x coordinate (indicated by the block vector) is outside the current CTU or left neighboring CTU range, the block vector may be clipped to be at the leftmost column of the current CTU. Accordingly, an out-of-bound block vector can be clipped such that the modified reference block is at either the top row or leftmost column of the current CTU.

It is noted that all other constraints (e.g., the first, second, third, and fifth constraints described above) may still be used/imposed to evaluate whether the modified block vector is valid.

In an embodiment of the present disclosure, the following bitstream constraints may be removed by applying modifications (either clipping or modulo operations described above) to the decoded block vector:

One or both the following conditions shall be true:
The value of (mvL[0]>>4)+cbWidth is less than or equal to 0; and
The value of (mvL[1]>>4)+cbHeight is less than or equal to 0.

The above conditions may be used to ensure that the reference block does not overlap with the current block. If the reference block overlaps with the current block (i.e., both of the conditions are false), the block vector can be modified to ensure at least one of the above two conditions becomes true. In an embodiment of the present disclosure, the above two conditions may be removed even if no operation/modification is performed on the decoded block vector.

In an example, the following operations may be applied to ensure that one of the above two conditions becomes true:
When (mvL[0]>>4)+cbWidth>0 and (mvL[1]>>4)+cbHeight>0, the following applies:
mvL[0]=−cbWidth<<4.

In another example, the following operations may be applied to ensure that one of the above two conditions becomes true:
When (mvL[0]>>4)+cbWidth>0 and (mvL[1]>>4)+cbHeight>0, the following applies:
mvL[1]=−cbHeight<<4.

VI. Exemplary Decoding Processes

Figure 11:
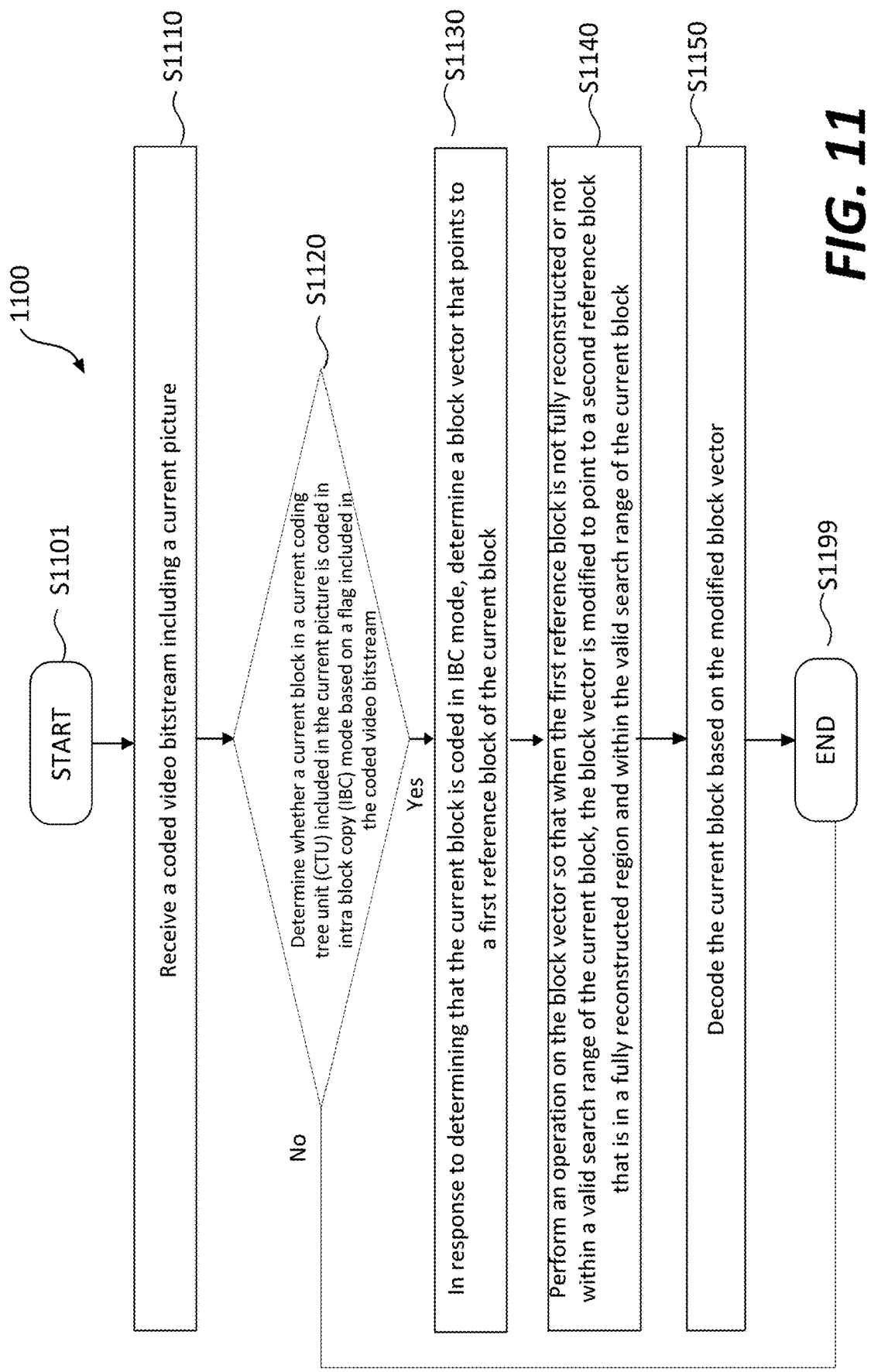
FIG. 11 shows a flow chart outlining a decoding process in accordance with an embodiment.

FIG. 11 shows a flow chart outlining a decoding process (1100) according to some embodiments of the disclosure. The process (1100) can be used in decoding a current block in IBC mode. In various embodiments, the process (1100) can be executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a coded video bitstream including a current picture is received.

At (S1120), whether a current block in a current coding tree unit (CTU) included in the current picture is coded in intra block copy (IBC) mode is determined based on a flag included in the coded video bitstream. The flag may be the IBC flag that indicates the use of IBV at a block level. If it is determined that the current block is not coded in IBC mode, the process illustrated in FIG. 11 is terminated.

At (S1130), in response to determining that the current block is coded in IBC mode, a block vector that points to a first reference block of the current block is determined. The block vector may be determined based on an IBC AMVP mode or merge mode.

At (S1140), an operation is performed on the block vector so that when the first reference block is not fully reconstructed or not within a valid search range of the current block, the block vector is modified to point to a second reference block that is in a fully reconstructed region and within the valid search range of the current block. For example, a modulo operation can be performed on each of an x component and a y component of the block vector based on a size of the current CTU. In an embodiment, the x component of the block vector and the y component of the block vector may be modified using the Eq. (9) and Eq. (10). In an embodiment, a modulo operation is performed on the x component of the block vector based on a multiple of the size of the current CTU. A modulo operation is performed on the y component of the block vector based on the size of the CTU. When the block vector points to a reference block that is fully reconstructed and within a valid search range of the current block, the performed operation (e.g., Eq. (9) and Eq. (10)) does not modify the block vector. In that case, the first reference block is the same as the second reference block.

At (S1150), the current block is decoded based on the modified block vector. Specifically, the current block may be decoded based on the reference samples in the second reference block pointed by the modified block vector. The process (1100) proceeds to and terminates at (S1199).

VII. Computer System

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
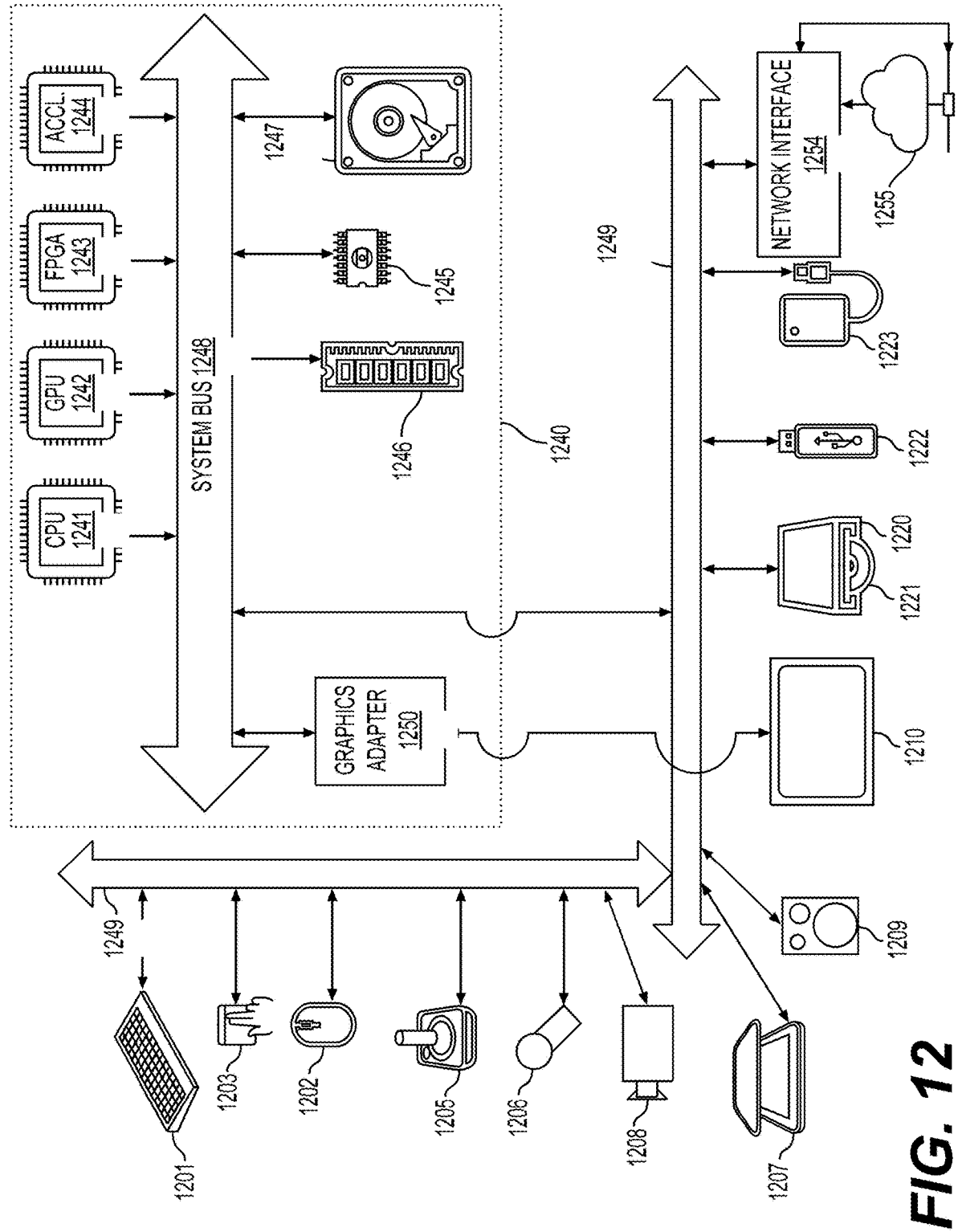
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
CG: Coefficient Group
IBC: Intra Block Copy While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
  receiving a coded video bitstream of a current picture;
  determining a block vector of a current block that is coded in intra block copy (IBC) mode, the block vector pointing to a first reference block of the current block in the current picture;
  performing an operation on at least one component of the block vector based on the first reference block being outside a search range of the current block, the block vector being modified by the operation to point to a second reference block that is within the search range for the current block; and
  decoding the current block based on the modified block vector,
  wherein the performing the operation includes performing a modulo operation on a y component of the block vector based on a size of a current coding tree unit (CTU) that includes the current block.

2. The method according to claim 1, wherein
  the search range is in a fully reconstructed region, and
  the second reference block and the current block are in a same tile, slice, or tile group.

3. The method according to claim 1, wherein the performing the operation further comprises:
  performing the modulo operation on an x component of the block vector based on the size of a current coding tree unit (CTU) that includes the current block.

4. The method according to claim 1, wherein the performing the operation comprises:
  performing the modulo operation on an x component of the block vector based on a multiple of a size of the current CTU that includes the current block.

5. The method according to claim 1, wherein the performing the operation modifies the block vector only when the first reference block is not fully reconstructed or not within the search range of the current block.

6. The method according to claim 1, wherein the performing the operation does not modify the block vector when the first reference block is fully reconstructed and within the search range of the current block.

7. The method according to claim 1, wherein
  the second reference block is in the search range of the current block, and the search range includes the current CTU that includes the current block.

8. The method according to claim 1, wherein the performing the operation modifies the block vector such that an offset of the first reference block relative to a CTU including the first reference block is the same as an offset of the second reference block relative to the current CTU that includes the current block.

9. The method according to claim 1, wherein the performing the operation comprises:
clipping the block vector so that the clipped block vector points to the second reference block that is at a boundary of the search range of the current block based on the first reference block not being fully reconstructed or not being within the search range of the current block.

10. An apparatus, comprising:
processing circuitry configured to
receive a coded video bitstream of a current picture;
determine a block vector of a current block that is coded in intra block copy (IBC) mode, the block vector pointing to a first reference block of the current block in the current picture;
perform an operation on at least one component of the block vector based on the first reference block being outside a search range of the current block, the block vector being modified by the operation to point to a second reference block that is within the search range for the current block; and
decode the current block based on the modified block vector, wherein
the operation performed on the at least one component includes a modulo operation performed on a y component of the block vector based on a size of a current coding tree unit (CTU) that includes the current block.

11. The apparatus according to claim 10, wherein
the search range is in a fully reconstructed region, and
the second reference block and the current block are in a same tile, slice, or tile group.

12. The apparatus according to claim 10, wherein the operation performed on the at least one component further includes the modulo operation performed on an x component of the block vector based on the size of the current CTU that includes the current block.

13. The apparatus according to claim 10, wherein the operation performed on the at least one component further includes the modulo operation performed on an x component of the block vector based on a multiple of a size of the current CTU that includes the current block.

14. The apparatus according to claim 10, wherein the processing circuitry is configured to modify the block vector only when the first reference block is not fully reconstructed or not within the search range of the current block.

15. The apparatus according to claim 10, wherein the processing circuitry is configured to not modify the block vector when the first reference block is fully reconstructed and within the search range of the current block.

16. The apparatus according to claim 10, wherein
the second reference block is in the search range of the current block, and
the search range includes the current CTU that includes the current block.

17. The apparatus according to claim 10, wherein the processing circuitry is configured to modify the block vector such that an offset of the first reference block relative to a CTU including the first reference block is the same as an offset of the second reference block relative to the current CTU that includes the current block.

18. The apparatus according to claim 10, wherein the processing circuitry is configured to:
clip the block vector so that the clipped block vector points to the second reference block that is at a boundary of the search range of the current block based on the first reference block not being fully reconstructed or not being within the search range of the current block.

19. A non-transitory computer-readable storage medium storing instructions which when executed by a computer for video decoding cause the computer to perform:
receiving a coded video bitstream of a current picture;
determining a block vector of a current block that is coded in intra block copy (IBC) mode, the block vector pointing to a first reference block of the current block in the current picture;
performing an operation on at least one component of the block vector based on the first reference block being outside a search range of the current block, the block vector being modified by the operation to point to a second reference block that is within the search range for the current block; and
decoding the current block based on the modified block vector,
wherein the performing the operation includes performing a modulo operation on a y component of the block vector based on a size of a current coding tree unit (CTU) that includes the current block.

20. The non-transitory computer-readable storage medium according to claim 19, wherein
the search range is in a fully reconstructed region, and
the second reference block and the current block are in a same tile, slice, or tile group.

* * * * *